United States Patent [19]

Datta et al.

[11] Patent Number: 5,981,643
[45] Date of Patent: Nov. 9, 1999

[54] DEPRESSION OF THE GLASS TRANSITION TEMPERATURE OF POLYOLEFINS CONTAINING CYCLIC MONOMERS

[75] Inventors: Sudhin Datta; Bruce A. Harrington, both of Houston, Tex.

[73] Assignee: Exxon Chemical Patents, Inc., Baytown, Tex.

[21] Appl. No.: 08/947,999

[22] Filed: Oct. 9, 1997

[51] Int. Cl.⁶ .................................................. C08K 5/01
[52] U.S. Cl. .............................................................. 524/491
[58] Field of Search ............................................ 524/491

[56] References Cited

U.S. PATENT DOCUMENTS

| | | | |
|---|---|---|---|
| 3,222,330 | 12/1965 | Nyce et al. | 260/80.5 |
| 3,676,390 | 7/1972 | Vergne et al. | 260/31.8 HR |
| 4,132,698 | 1/1979 | Gessler | 524/518 |
| 4,195,013 | 3/1980 | De Zarauz | 260/42.33 |
| 4,316,971 | 2/1982 | Rim | 525/301 |
| 4,540,753 | 9/1985 | Cozewith et al. | 526/88 |
| 5,179,171 | 1/1993 | Minami et al. | 525/288 |
| 5,225,503 | 7/1993 | Sagane et al. | 526/169.2 |
| 5,290,886 | 3/1994 | Ellul | 524/515 |
| 5,397,832 | 3/1995 | Ellul | 524/515 |
| 5,552,489 | 9/1996 | Merrill | 524/554 |
| 5,610,254 | 3/1997 | Sagane et al. | 526/282 |
| 5,691,432 | 11/1997 | Williams | 526/283 |

FOREIGN PATENT DOCUMENTS

| | | |
|---|---|---|
| 920742 | 2/1973 | Canada . |
| 621308 | 10/1994 | European Pat. Off. . |
| 202887 | 10/1983 | German Dem. Rep. . |
| WO 94/00642 | 1/1994 | WIPO . |

OTHER PUBLICATIONS

"Prediction of Polymer Properties" by J. Bicerno, published by Marcel Dekker, Inc., New York, NY(1993), p. 149.

Bulletin of the American Physical Society, VI, p. 123 (1956).

Polymer Bulletin V18, p. 73 (1987).

W. Kaminsky, M. Arndt and A. Bark, American Chemical Society: Polymer Reprints, V32, p. 467 (1991).

Marcromolecules 1988, vol. 21, p. 3360 (Ver Strate, et al.).

*Primary Examiner*—Paul R. Michl
*Attorney, Agent, or Firm*—Douglas W. Miller; Joseph F. Reidy

[57] ABSTRACT

Copolymers of ethylene and a cyclic olefin, preferably a fused ring cyclic olefin (FRCO), optionally containing an alpha-olefin and/or a non-conjugated diene, display increasing glass transition temperatures ($T_g$) as the amount of FRCO in the copolymer increases. This increase brings these polymers quickly above a $T_g$ acceptable as elastomers. Addition of specially selected process oils, based on cohesive energy densities of both the copolymer and the process oil, is shown to lower $T_g$ to a range acceptable for elastomers e.g. below about −30° C. The copolymer/process oil combination can then be used in elastomer compounding operations and behave in typical elastomer fashion.

12 Claims, 7 Drawing Sheets

Figure 1: Increase in Tg of SBCCPE as composition of Norbornene in an ethylene copolymer Figure 2: Increase of density and refractive index of SBCCPE on incorporation of the FRCO.

Figure 3: Tg for SBCCPE with 6.4 mole % norbornene

Figure 4: Tg for SBCCPE with 9.8% mole norbornene

DEPRESSION OF THE GLASS TRANSITION TEMPERATURE OF POLYOLEFINS CONTAINING CYCLIC MONOMERS

TECHNICAL FIELD

Embodiments of this invention regard certain saturated backbone cyclic comonomer polyolefins(SBCCP), and materials and methods that are used to render the otherwise non-elastomeric SBCCP, elastomeric in nature. Elastomers are generally defined as having a glass transition temperature below −30° C.

BACKGROUND

Ethylene cyclic olefin polymers would be excellent rubbery materials with beneficial optical properties of a high refractive index and mechanical properties of low tension set if they had elastomeric properties. However, as is known, such polymers generally exhibit glass transition temperatures ($T_g$) well above the generally recognized $T_g$ of elastomers (elastomers having a $T_g$ generally below room temperature, preferably below −35° C.). This behavior, while generally applicable, is specifically applicable to such ethylene cyclic olefin polymers with molecular weights (number average, $M_n$) at least five times greater than the entanglement molecular weight ($M_e$) for such polymers.

The introduction of cyclic olefins, and in particular, fused ring cyclic olefins (FRCO) into SBCCP leads to rapid increase in the glass transition temperature ($T_g$) of the SBCCP. These changes arise both from the introduction of catenated chains of the carbon atoms pendant on the saturated polyolefin backbone as well as from the introduction of rigidity of the fused ring cyclic olefin structure arising from the FRCO. Both of these effects have been studied and documented. In general, for the effect on the $T_g$, the introduction of equal mole fractions of alpha olefins, cyclic olefins, and FRCO of approximately equal number of carbon atoms increases with the degree of cyclic structures introduced into the SBCCP. For example in the book "Prediction of Polymer Properties" by J Bicerno published by Marcel Dekker Inc., New York, N.Y., (1993) page 149 and thereafter, it is shown that for saturated backbone polymers composed of carbon and hydrogen, the $T_g$ of the polymers increases with addition of carbon based radical chains to the main saturated backbone of polymer. The increase in the $T_g$ is most evident for the introduction of cyclic groups in the polymers. This information is shown below in Table 1.

TABLE 1

Glass transition temperature in degrees K for typical SBCCP

| Polymer | $T_g$ in degrees K |
| --- | --- |
| Polyethylene | 195 |
| Polypropylene | 233 |
| Poly(5-methyl-1-hexene) | 259 |
| Poly(4-methyl-1-pentene) | 302 |
| Poly(4-cyclohexyl-1-butene) | 313 |
| Poly(vinyl cyclohexane) | 363 |
| Poly(cyclopentene) | 362 |
| Poly(bicylco(2.2.1)heptene) | 603 |

The data above pertains only to homopolymers. The data for copolymers is less easily available, but can be estimated. It is expected that the $T_g$ of copolymers of FRCO and other monomers such as ethylene is intermediate between the $T_g$ of the homopolymers of the constituent monomers. It is known that in such cases the $T_g$ of the copolymer depends on the relative amounts of the two olefins which form the copolymers. The relationship between the composition of the copolymer in terms of the composition of the two parent olefins has been investigated by T. G. Fox in Bulletin of the American Physical Society V1, p 123 (1956). This relationship shows that the $T_g$ of a copolymer of two monomers 1 and 2, present in weight fractions M1 and M2, whose homopolymers have glass transition temperature of $T_{g1}$ and $T_{g2}$, respectively is given by the relationship in Equation 2

$$\frac{1}{T_g} = \frac{M1}{T_{g1}} + \frac{M2}{T_{g2}} \qquad \text{Eq (2)}$$

In spite of this increment in the glass transition temperature of SBCCP containing FRCO there have been several attempts to use these SBCCP as elastomeric articles, particularly in vulcanizates. Thus, in U.S. Pat. No. 4,195,013, the author describes the formation and compounding with process oils and filler in a polymer similar to the SBCCP. However, the document does not disclose the lowering of the $T_g$ of SBCCP by dilution addition with specific process oils. The purported advantages, arise because of the 'monomer which, when introduced in small quantity, makes it possible to increase the vitreous transition temperature of the tetrapolymer'. Thus, this document relies on the increases of the $T_g$ of the SBCCP to obtain the purported improvement. Shown in the data in Table III of the document, the $T_g$ of the polymers increases with addition of the FRCO and is likely to be causative for the purported improvements described in the document.

Moreover, the general use of process oils to lower the $T_g$ of SBCCP containing FRCO has not been suggested previously. In U.S. Pat. No. 5,290,886 and U.S. Pat. No. 5,397,832, the lowering of the $T_g$ of polyolefin elastomers and plastics by the addition of process oils has been shown. These process oils can be classified as the first class and second class (vide infra) in the specification of the current invention. In '886 and '832 the process of lowering the $T_g$ by using process oils as well as the process of selection of the process oils is discussed. However, neither of the suggested polymers contain a FRCO.

There is a need therefore for an ethylene cyclic olefin copolymer defined as an SBCCP containing a FRCO that can include elastomeric properties, particularly having a sufficiently low $T_g$.

SUMMARY

We have discovered that saturated backbone ethylene cyclic olefin copolymers SBCCP; optionally including non-conjugated dienes and/or alpha-olefins, in which SBCCP by themselves have a $T_g$ above the elastomeric range, often even above 0° C., can be rendered elastomeric having a $T_g$ lower than −35° C. (as defined by $T_g$) by addition of carefully selected process oils, where the relationship between the cohesive energy density of the two components (SBCCP and process oil) is similar. Such additions of process oils are most often found in well known rubber and elastomeric polymer compounding operations. The resultant compound will be further defined herein.

However, not all process oils will be effective in lowering the $T_g$ of the SBCCP when added in amount in common use in the rubber compounding art. In fact, some process oils, in order to lower $T_g$ of the SBCCP to the elastomeric range, would be added in such quantity that the physical properties of the compound might be severely compromised. Such additions of process oils are most often found in well known rubber/elastomeric compounding operations. The resulting compound will be further defined herein.

More specifically, in certain embodiments we have unexpectedly and surprisingly found that a polymer combination comprising a SBCCP as explained above, where the ethylene is present in the copolymer in the range of 40–95 mole %, and the cyclic olefin is present in the copolymer in the range of 5–60 mole %, where the $T_g$ of the copolymer is generally greater than −20° C., −10° C., often above −5° C. and even above 0° C., and a process oil present in the combination at an effective amount and having a sufficient aniline point, will lower the $T_g$ of the combination to at least −20° C., preferably below −30° C., more preferably below −35° C., most preferably lower than −40° C. The process oil has a boiling point high enough so that not more than 5% of the process oil is distilled at temperatures greater than 200° C.

In combination, the process oil and SBCCP maintain a $T_g$ in the preferred range, lower than −20° C., after aging (e.g. in an open container) at 180° C. for 2 hours or at 23° C. for 60 days at ambient pressure or for 12 hours at 100° C. at 100 mm absolute pressure.

In another embodiment, a SBCCP/process oil combination is provided having a $T_g$ lower than −30° C. comprising a saturated backbone ethylene cyclic olefin polymer of $M_n$>20,000, where the ethylene is present in the range of about 40–95 mole %, the cyclic olefin is present in the polymer in the range of from about 5–60 mole % wherein the ethylene cyclic olefin polymer has a backbone substantially free of unsaturation, wherein the ethylene cyclic olefin polymer contains less than about 0.25 mole % of hetero atom containing moieties, and a process oil having a sufficient aniline point and present in the composition in an effective amount to provide the combination of the ethylene cyclic olefin polymer and process oil with a $T_g$ lower than −30° C. Hetero atom containing moieties are atoms or groups of atoms which contain atoms other than carbon or hydrogen.

In yet another embodiment a combination of a SBCCP and process oil is provided including a process oil where the combination has a $T_g$ below lower than −30° C. comprising a SBCCP including ethylene, a cyclic olefin, optionally an alpha-olefin and/or optionally a non-conjugated diene, wherein the ethylene is present in the SBCCP from about 95–40 mole percent, the cyclic olefin is present in the SBCCP in the range of from 5–60 mole %, an alpha-olefin is present in the range of from about 0–20 mole %, and a non-conjugated diene is present in the SBCCP in the range of from about 0–4 mole %, and a process oil having an aniline point sufficient to lower the $T_g$ of the SBCCP combination below about −30° C. The total mole % of any such combination of 2–4 or greater monomers will always add up to 100 mole %.

BRIEF DESCRIPTION OF THE DRAWINGS

These and other features, aspects, and advantages of the present invention will become better understood with reference to the following description, appended claims, and accompanying drawings, where:

DESCRIPTION

Introduction

Various embodiments of the present invention concern certain polymer/process oil combinations and certain compounds based on the combinations and applications based on the polymer/process oil combinations and/or compounds based on the combination. These polymer-process oil combinations have properties that generally are not achievable with the polymer alone, which make the combinations particularly well-suited for elastomeric applications that primarily require elastomeric behavior as demonstrated by a $T_g$ below room temperature, preferably below −20° C. An optional inclusion of alpha-olefin can improve the low temperature physical properties of the SBCCP/process oil combination based compound and the optional inclusion of a non-conjugated diene will generally permit thermoset crosslinking elastomeric properties.

Use of the term compound in the present specification will be that of a group of ingredients generally used in the rubber or elastomer arts, that include but are, not limited to, fillers (both reinforcing and extending) accelerants, curatives, and the like. Such ingredients and practices described in the book "Rubber Technology Handbook" by W. Hofmann published by Carl Hanser Verlag, Munich, Germany in 1989. Lists of commonly available compounding ingredients are also available in the book "Rubber Compounding Ingredients" also known as the "Blue Book" available through Rubber World, Akron, Ohio, USA. These references are incorporated herein for purposes of US patent practice.

Following is a detailed description of various preferred polymer/process oil combinations within the scope of the present invention, preferred methods of producing these combinations including methods for preparing the polymer and selecting the process oil, preferred ethylene cyclic olefin polymers that may be included in such combinations, and preferred applications of these polymer combinations. General elastomeric applications will be available to a compounded SBCCP/process oil combination, such as automotive door gaskets. Those skilled in that art will appreciate that numerous modifications of these preferred embodiments can be made without departing from the scope of this invention. For example, although the properties of the ethylene cyclic olefin polymers and process oil combinations are exemplified, numerous other alpha-olefins and or non-conjugated dienes as substituents in the SBCCP are also contemplated. To the extent our description is specific, it is solely for purpose of illustrating preferred embodiments of our invention and should not be taken as limiting the present invention to these specific embodiments.

While the addition of process oils to the SBCCP and other polymers related to it by changes in the structure are known, it is hitherto unknown that the addition of the process oils could lead to lowering of the $T_g$ of the SBCCP polymer by a substantial amount and thereby imparting elastomeric behavior to the SBCCP/process oil combination. It is important in the context of embodiments of our invention to designate the amount of the depression of the $T_g$ of the SBCCP as a result of the formation of the combination with the process oil. Small changes in the $T_g$, of the order of a 1 to 3° C., are of small consequences in the description. In part, this is because of the inherent inaccuracies of the measurement of the difference of the $T_g$ of the SBCCP and the composite of the process oil and the SBCCP. Further, small changes in the $T_g$, in the range indicated above, may occur by a variety of processes, such as compounding and dilution which are not the subject of the present invention. Embodiments of the present invention are concerned with differences (generally lowering) in the $T_g$ of the SBCCP through the combination of the process oil and the SBCCP which are larger than about 7° C., more preferably larger than about 15° C. and most preferably larger than about 25° C. when measured as the difference between the $T_g$ of the SBCCP and the $T_g$ of the combination. Such combinations and their $T_g$ lowering and resulting elastomeric behavior of the combination have been heretofore unknown.

The use of headings in the present application is intended to aid the reader, and is not intended to be limiting in any way.

The SBCCP

For purposes of this document, the SBCCP is a polymer or copolymer meaning either ethylene and a cyclic olefin, but also including polymers with one or more of non-conjugated dienes and/or alpha-olefins included with the ethylene and cyclic olefin. We define Saturated Backbone Cyclic Comonomer Polyolefin (SBCCP) to be copolymers that contain ethylene, a cyclic olefin, preferably a fused-ring cyclic olefin (FRCO) and optionally additional alpha olefins of carbon number $C_3$ to $C_{20}$, such as propylene. In addition, small quantities of a non-conjugated diene which are useful for vulcanization may also be present. The amount of non-conjugated diene used for vulcanization is generally less than about 5 mole % though amounts from about 0–4 mole % are preferred, more preferred 0–2 mole %. Example of non-conjugated dienes may be found in U.S. Pat. No. 5,610,254, incorporated herein by reference for purposes of US patent practice.

Cyclic Olefin (FRCO)

The cyclic olefin is defined as a mono-olefin where the polymerizable double bond of the olefin is a part of at least one carboxylic ring structure. The SBCCP contains 5–60 mole %, preferably 7–40 mole % of the cyclic olefin, though 7 to 30 mole % is preferred, more preferred 8–30 mole %. Examples of FRCO are shown in U.S. Pat. Nos. 5,225,503 and 5,179,171 included herein by reference for the purpose of US patent practice. The preferred FRCO is norbornene (bicyclo(2.2.1) hept-2-ene).

An examination of the preferred structures of this description of the SBCCP shows that the non-conjugated diene and the cyclic olefin may have a similar carbocyclic structure, but differ in the number of the olefinic unsaturation bonds in the molecule. The non-conjugated diene has a minimum of two unsaturated olefins while the cyclic olefin can have only one.

The Alpha-Olefin

Alpha-olefins that may be included are $C_3$–$C_{10}$, preferred $C_3$–$C_8$, e.g. propylene, butene-1, pentene-1, 4-methyl-1-pentene, hexene-1, heptene, octene, nonene, decene and combinations thereof. The alpha-olefin or alpha-olefin, if present are present in said SBCCP in the range of from 0–30 mole %, preferably 1–20 mole %, more preferably 3–20 mole %.

The Polymer

Ethylene polymerizes to yield a linear chain composed of methylene units. The incorporation of the alpha-olefins leaves a pendant alkyl group, composed of two less carbon atoms than the parent olefin. The incorporation of cyclic olefins leaves a cyclo alkane moiety on the polymer. The cyclo alkane moiety or residue, in common with alpha olefins, contains one or more carbon atoms catenated to the backbone carbon atoms. However, the cyclo olefin residue is distinct, from alpha-olefins, since at least one of the above catenated carbon atoms is additionally catenated to at least one additional backbone carbon atom. These carbon atoms are bridging carbon atoms. Typically the catenation length of these bridging carbon atom is less than 10 units long, preferably about 2 to 7 units. In this preferred description for the SBCCP we have indicated that FRCO such as norbornene are particularly desirable for the practice of certain embodiments of the invention. FRCO are distinguished by having a cyclic olefin residue in the SBCCP where two or more independent or partly independent catenations of carbon atoms attach any two of the backbone carbon atoms. It is reasonable to expect that the introduction of cyclic olefins and in particular FRCO into the backbone of a SBCCP is expected to restrict or limit the possible range of motions possible in the polyolefin system. This is because in the neighborhood of the cyclic olefin in the SBCCP most of the possible stereochemical conformations possible for an acyclic system are inhibited due to the presence of catenated carbon chains pendant from the backbone and prohibited due to the presence of the bridging carbon atoms which are attached to more than one backbone carbon atom. Stereochemical conformations of these polymers which require the twisting or rotation of bonds are prohibited in these SBCCP polymers since the rotation would require rupture of the chemical bonds.

The synthesis of SBCCP containing FRCO has been widely described in the prior art. Synthesis using Ziegler-Natta vanadium catalysts have been described in Canadian Patent 920742 issued Feb. 6, 1973 and assigned to DuPont, in U.S. Pat No. 5,179,171 issued Jan. 12, 1993 and assigned to Mitsui Petrochemical and in U.S. Pat. No. 5,225,503 issued Jul. 6, 1993 and assigned to Mitsui Petrochemical. Synthesis using metallocene catalysts may also be practiced and has been described in International Patent Application PCT/US94/00642 on Aug. 4, 1994 with Exxon Chemical as the applicant.

The description of the structure of the SBCCP is restricted in composition. SBCCP contains few, if any, hetero atoms other than carbon and hydrogen. It is possible, in an embodiment of our invention, that the SBCCP may contain limited amount of hetero atoms introduced either during the polymerization process or in some post reactor polymer modification process either of which processes are well known to those of ordinary skill. In a broad embodiment, the hetero atoms are any atoms which are different than carbon and hydrogen. In the preferred form of the embodiment these hetero atoms may be oxygen, nitrogen, sulfur, bromine or chlorine. The amount of the hetero atoms are specified as the mole percent of the functional group containing the hetero atom. An embodiment of our invention contains less than 1.0 mole % of the hetero atoms defined above, while compositions containing less than 0.25 mole % of the hetero atoms are preferred in this embodiment. In this embodiment of the invention the limitations of the proportion of the other constituents of the SBCCP as described above will have to be adjusted to accommodate relatively this small amount of hetero atom containing functional group. Non-limiting examples of such a hetero atom containing functional group which may be incorporated in the SBCCP are methacrylates, maleic anhydride, 5-methylamine-2-norbornene or 5-bromo-2-norbornene.

EPDM polymers containing halogens incorporated in the non-conjugated dienes or in the FRCO are thus not the preferred embodiment of this invention. Polymers described in U.S. Pat. No. 3,222,330 assigned to DuPont incorporated herein by reference for purposes of US patent practice, which contain the halogenated derivatives of norbornene and thus contain a halogenated cyclic olefin, in quantity larger than the limitations of composition above, are also excluded from our definition of SBCCP. Thus the SBCCP of our invention are composed largely, and preferably exclusively, of carbon and hydrogen.

Within the preferred embodiment of having the SBCCP composed of carbon and hydrogen, we define the SBCCP to have a backbone composed substantially of a chain of carbon atoms attached to each other by single bonds. Single bonds from any carbon in the backbone may attach any carbon atom to several other carbon atoms in the backbone of the chain, but there is no more than one bond between any two carbon atoms along the backbone. The backbone is defined as the longest string of contiguous carbon atoms in the SBCCP which participate in the polymerization process by being converted from independent olefin functionality to a catenated carbon chain. It is implied in this description of the backbone of the SBCCP that the backbone does not contain any atoms other than carbon and these carbon atoms are connected by a single bond. Atoms of hydrogen are attached to the backbone carbon atoms of the SBCCP to fulfill the requirements of the chemical formula. Polymers of cyclic olefins such as norbornene and dicyclopentadiene, which are obtained by the metathesis of these olefins, result in polymers which contain double bonds along the backbone of the polymer chain and are thus not included in the description of this invention. Examples of such polymers are available in U.S. Pat. No. 3,676,390, incorporated herein by reference for purposes of US patent practice.

Composition Distribution

The SBCCP of embodiments of the current invention are polymers which do not have a significant intramolecular or intermolecular compositional variation. Variation of intermolecular composition may be determined by physical methods such as solvent or thermal fractionation of the bulk polymer to physically separate the polymer into two or more fractions which differ in their composition. In this separation procedure the polymers are typically not degraded in molecular weight or otherwise chemically transformed. We limit our invention of the lowering of the $T_g$ of the SBCCP to polymers which have only a limited amount of intermolecular compositional distribution. The compositional distribution of the polymers is indicated by the variation in the ethylene content of the polymer. It is understood that the changes in the ethylene content of the polymer are accompanied by adjustment of the composition of the other components of the SBCCP. We accept compositional difference of less than 20% in ethylene content between the fractions of the polymer each representing a minimum of 10% of the weight of the polymer. Such compositional differences imply, at most, a corresponding 20% difference in the composition of the cyclic olefin in the same fraction of the polymer.

The extent of the allowed intramolecular compositional change in the polymer is much less than the above limitations in intermolecular compositional. Intramolecular changes arise from a change in the distribution of the monomer residues in any one polymer chain. These changes can arise from a change in the polymerization kinetics of the catalyst for the various monomer residues or from the changes in the environment of the polymerization in the reactor. An example of such an intramolecular compositional distribution in the SBCCP is shown in the polymer which has a statistically significant number of cyclic olefin residues adjunct to or in proximity to one another, while other portions of the same polymer chain are devoid of the cyclic olefin residues. Embodiments of our invention are directed towards SBCCP which have little or no statistically significant changes in the intramolecular composition. Thus the SBCCP of this invention, in any statistically significant section or portion, have the same concentration of cyclic olefins and non-conjugated dienes.

Glass Transition Temperature

The $T_g$ of SBCCP and/or the SBCCP/process oil combination is dependent both on the composition as well as the molecular weight of the SBCCP. SBCCP with molecular weight lower the entanglement molecular weight of a given SBCCP will have a $T_g$ lower than that expected for the composition. This depression of $T_g$ for SBCCP polymers of the same composition, but lower in molecular weight, has been studied and defined by the Fox-Flory equation which indicates that the glass transition temperature $T_g'$ of low molecular weight ($M_n'$) polymers is indicated by Equation 1

$$T_g' = T^{\infty}(C/M_n') \qquad \text{Eq (1)}$$

$T^{\infty}$ is the hypothetical glass transition temperature of a polymer of the same composition but of an infinite molecular weight, while C is a constant which is similar in value to the entanglement molecular weight of the SBCCP of the same composition. The equation shows that the $T_g'$ of the SBCCP approaches $T^{\infty}$ as the molecular weight (Mn') of the SBCCP approaches and then exceeds C. The difference between $T_g'$ and $T^{\infty}$ is the largest for values of $M_n'$ much less than C. The SBCCP/process oil combination (vide infra) of embodiments of the current invention consists of combinations which are elastomeric in properties and the SBCCP have molecular weights much higher than the entanglement molecular weight of the polymer and thus higher than C. As an example of the difference in the C and the $M_n$ of the polymer of embodiments of this invention we expect that for an SBCCP containing 25 wt. % norbornene as the cyclic olefin the entanglement molecular weight is approximately 5000 amu while the $M_n$ of the polymer for this invention is greater than 40,000 amu. SBCCP of molecular weight lower than 2 C are of limited use as elastomers and are not considered to be polymers of embodiments of our invention. In general, we intend that the minimum $M_n$ for polymers which will be useful elastomers upon addition of a process oil will be above about 20,000, preferably 30,000, more preferably above about 40,000 amu.

Making A Saturated Backbone Cyclic Comonomer Polymer Elastomer

SBCCP are made by a catalytic process of polymerizing the constituent olefin to form the SBCCP. In the most common embodiment, the catalytic process consists of contacting the olefins with a Ziegler polymerization catalyst under conditions which are indicated in the art well known to those of skill in the area, to produce rapid polymerization. These procedures have been described by reference above. These conditions, of polymerization include, but are not limited to solid phase, liquid phase and gas phase processes. Ziegler catalysts for polymerization involve at least one catalytic component which contains a transition metal. This description of the catalyst includes the more recent examples of metallocene catalysts along with alumoxane and ionic activators. Common examples of such a Ziegler polymerization systems are the catalyst systems such vanadium tetrachloride, titanium trichloride or derivatives of bis-cyclopentadienyl zirconium dichloride activated with methyl alumoxane.

Ethylene polymerizes to yield a linear chain composed of methylene units. The incorporation of the alpha-olefins leaves a pendant alkyl group, composed of two less carbon atoms than the parent olefin. The incorporation of cyclic olefins leaves a cyclo-alkane moiety on the polymer. In this cyclo-alkane residue, a distinct structural feature is present which is central to embodiments of our invention. The cyclo-alkane residue, in common with alpha olefins, contains one or more carbon atoms catenated to the backbone carbon atoms. However, the cyclo-olefin residue is distinct in that at least one of the above catenated carbon atoms is additionally catenated to at least one additional backbone carbon atom. These carbon atoms are bridging carbon atoms. Typically the catenation length of these carbon atom chains is less than 10 units long, preferably about 2–7 units. In this preferred description for the SBCCP, we have indicated that FRCO such as norbornene, are particularly desirable for the practice of the invention. FRCO are distinguished by having a cyclic olefin residue in the SBCCP where two or more independent or partly independent catenations of carbon atoms attach any two of the backbone carbon atoms. It is reasonable to expect that the introduction of cyclic olefins and in particular FRCO into the backbone of the SBCCP should restrict or limit the possible range of motions possible in the polyolefin system. This is because in the neighborhood of the cyclic olefin in the SBCCP most of the possible stereochemical conformations possible for an acyclic system are inhibited due to the presence of catenated carbon chains pendant from the backbone and prohibited due to the presence of the bridging carbon atoms which are attached to more than one backbone carbon atom. Stereochemical conformations of these polymers which require the twisting or rotation of bonds are prohibited in these SBCCP polymers since the rotation would require rupture of the chemical bonds.

Figure 1:
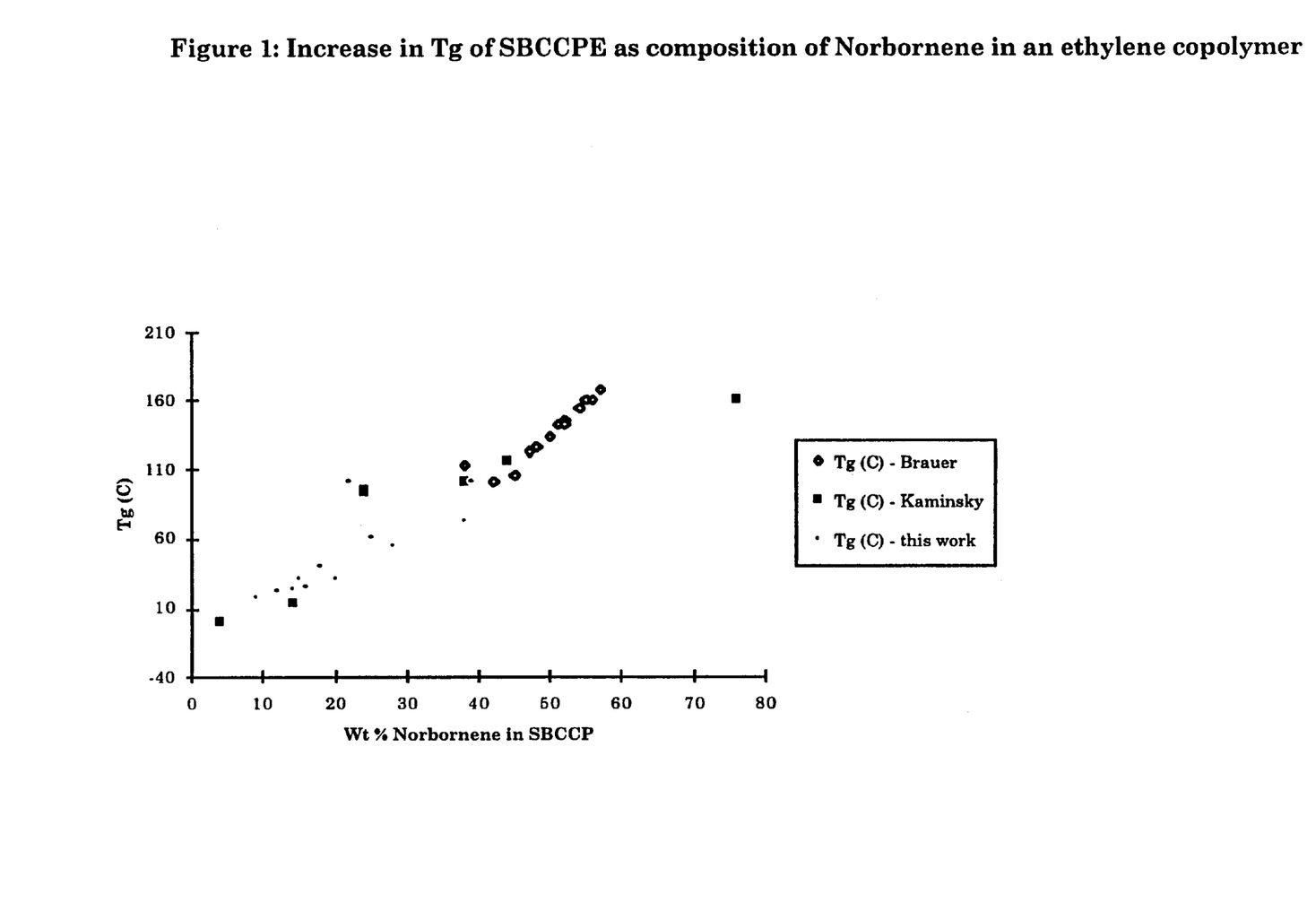
FIG. 1 shows the increase in $T_g$ of SBCCP as weight % of norbornene increases.

In the particular case of the copolymers of ethylene and norbornene we have collected the experimental data for the glass transition temperature for SBCCP composed of these two olefins. This data is shown in FIG. 1 and includes evaluation that were performed under our supervision and direction as well as the data from E. Brauer, C. Wild, H. Wieglub, Polymer Bulletin V18 pp. 73 (1987) (identified in FIG. 1 as 'Brauer') and W. Kaminsky, M. Arndt and A. Bark American Chemical Society: Polymer Preprints, V32, pp. 467 (1991) ) (identified in FIG. 1 as 'Kaminsky'). These disclosures (Kaminsky and Brauer) are included herein by reference for purposes of US patent practice. FIG. 1 shows that the glass transition temperature of the SBCCP increases steadily with increasing content of norbornene. It is expected that this increase in the $T_g$ of the SBCCP is evident in other polymers which contain FRCO other than norbornene.

The increase in the $T_g$ of the SBCCP on incorporation of the increasing amount of the FRCO is substantially a detriment to the use of these polymers as elastomers. Elastomers are required to have 'rubbery' characteristics which include elongation generally in excess of 200% with at least 65% elastic recovery to original, pre-elongated dimension after elongation for a period greater than 10 seconds and less than 5 minutes over a broad temperature extending to at least −30° C. It is well understood that polymers lose these beneficial elastomeric properties at temperatures close to or below the $T_g$ of the elastomer. It is believed that the elastomeric properties cease to be of any use at temperatures which are less than 10° C. above the $T_g$ of the polymer. Thus for use of these SBCCP polymers it is beneficial to be able to maintain the $T_g$ of the SBCCP to as low as practical for instance about or below −40° C. It is evident from the data presented in FIG. 1, that SBCCP containing more than a small (>10 wt. %) fraction of norbornene FRCO, is limited as an elastomer because of the rapid increase in the $T_g$ of the SBCCP.

Process Oil

We have invented the procedure which allows us to lower the $T_g$ of SBCCP containing larger amounts of norbornene FRCO than the small amounts discussed above. Such larger amounts of cyclic olefin or FRCO will generally lead to a polymer that is non-elastomeric in nature, defined herein as a polymer with a $T_g$ above −35° C., often above −20° C. and even above 0° C. The lowering of the $T_g$ allows the use of the SBCCP as a rubbery article with durable elastomeric properties when the SBCCP/process oil combination is used in above defined rubber or elastomeric polymer compounds. Embodiments of our invention include adding a process oil, composed principally of carbon and hydrogen and optional amounts of hetero atoms such as oxygen, to the SBCCP to form a mixture which has a much lower $T_g$ then the SBCCP absent the process oil. The invention includes embodiments which are enumerated below:

(a) In a first embodiment our invention consists of adding a process oil, which is defined below, to the SBCCP, as defined above, with the intent to lower the $T_g$ of the SBCCP.

(b) In a second embodiment our invention consists of the process of selection of the process oil to add to the SBCCP to lower the $T_g$ of the combination to the herein defined $T_g$. The selection process is based on correlation of cohesive energy density of the SBCCP with the aniline point of the process oil.

The process oil is typically known as extender oil in the rubber application practice. The process oils consist of two classes of materials. The first class consist of process oils which are composed essentially of carbon and hydrogen with traces of hetero atoms. These are typically petroleum refinery byproducts. Natural by-products such as pine tar and resinous materials are also included in these process oils. The second class of process oils are composed of carbon, hydrogen and at least one hetero atom. An example of this type of process oil are the diesters of aromatic diacids such as dioctyl phthalate. Another example of second class of process oils are ethers and polyethers. These process oils are commonly available either as neat solids or liquids or as physically absorbed mixtures of these materials on an inert support (e.g. clays, silica) to form a free flowing powder. We believe that all forms of these process oils are equally applicable to the description and the practice of the invention.

The first class of process oils usually include a mixture of a large number of chemical compounds which may consist of linear, acyclic but branched, cyclic and aromatic hydrocarbons. Trace amounts of refinery byproducts such as sulfur, oxygen and nitrogen containing compounds are usually present in these process oils and should not be considered limitations to our invention. As an article of commerce, these process oils are available as mixtures in combinations having similar boiling points. It is also anticipated that combinations of process oils each of which is described above may be used in the practice of the invention. The process oils have boiling points in the range of 125° C. to 300° C. and it is implied in the description of the process oils that the boiling point of any process oils spans a range of temperatures. It is important that the process oil be compatible or miscible with the SBCCP to form a homogenous one phase blend. The process oils of the first class expected to be found to be most suitable were aromatic and napthenic process oil which have a low aniline point. Examples of process oils are Sunpar® 150 and 220 from The Sun Manufacturing Company of Marcus Hook, Pa., USA and Hyprene® V750 and Hyprene V1200 from Ergon, Post Office Box 1639, Jackson, Miss. 39215-1639, USA. and IRM 903 from Calumet Lubricants Co., 10234 Highway 157, Princeton, La. 71067-9172, USA. Examples of aromatic and napthenic oils with a low aniline point are Sundex 790 (aniline point 36° C.) and IRM 903 with a aniline point of 70° C.

The second class of process oils which may be used to lower the $T_g$ of the SBCCP are certain low to medium molecular weight (Molecular weight ($M_n$) <10,000) organic esters and alkyl ether esters. The esters include esters of carboxylic acids as well as esters of phosphoric acids. Particularly suitable esters include monomeric and oligomeric materials having an average molecular weight below about 2000, and preferably below about 600. It is important that the ester be compatible or miscible with the SBCCP to form a homogenous one phase blend. The esters expected to be found to be most suitable were either aliphatic mono or diesters or alternatively oligomeric aliphatic esters or alkyl ether esters. Polymeric esters and esters are expected to be significantly less effective than the monomeric esters and ethers. Esters and ethers containing aromatic groups such as tricresyl phosphate and butyl benzyl phthalate are expected to be more effective than dioctyl phthlate. Combinations of one or more of then process oils in these classes or combinations of oils from both classes are also included in our definition of process oils. Such combinations have to contain at least one ingredient from the preferred composition and properties of either classes of process oils The addition of the process oils to the SBCCP maybe made by any of the conventional means known to the art. These include the addition of all or part of the process oil to the SBCCP prior to recovery of the polymer by steam distillation of the solvent of polymerization or addition of the process oil, in whole or in part, to the polymer as a part of a separate compounding step. In these compounding steps, other ingredients may be added to the SBCCP to form physical mixtures. The compounding step may be carried out in a batch mixer such as a mill or a internal mixer such as Banbury mixer. The compounding operation may also be conducted in a continuos process such as a twin screw extruder. In addition to the SBCCP and optionally other elastomers, these physical blends may contain various elastomeric polymer compounding and vulcanizing components well known to those of ordinary skill in the art. These compounds may include fillers, processing or softening oils, anti-oxidants, anti-ozonants, ultra-violet light stabilizers or absorbers, vulcanizing or curative agents, vulcanizing or curative accelerators, cure retarders, processing aids, flame retardants, tackifying resins, and the like. Fillers and/or reinforcing materials which are often used include carbon black, clay, talc, calcium carbonate, mica, silica, silicate, combinations thereof, and the like. The process and softening oils may be the same or different than the process oil added to the SBCCP to lower $T_g$.

The SBCCP physical mixture may include in the range of from about 10 about 400, preferably in the range of from about 10–250 parts by weight of the process oil or oils, per hundred parts of SBCCP, more preferably 10–100, even more preferably 30–70, and most preferably 40–65. Curing or vulcanizing agents which may be utilized include sulfur and certain sulfur donor compounds well known to those of ordinary skill in the art. Mixtures of these sulfur compounds may also be advantageously used. Alternatively vulcanizing agents based on peroxides or azides in conjunction with agents designed to enhance the effectiveness of peroxide vulcanization may be present. In another embodiment of the invention, vulcanizing agents based on the condensation products of phenols and formaldehyde may be present in conjunction with a Lewis acid catalyst designed to increase the effectiveness of these curatives in the SBCCP. The description of curative process is exemplary and all useful vulcanization procedures may be used for these polymer compositions.

Notwithstanding the presence of other materials in the combination of the SBCCP and the process oil, the essential ingredients in certain embodiments of our invention is the physical combination of the SBCCP and the process oil. The process oil may be added by any of the experimental techniques disclosed in the art. It is within an embodiment of our invention to add all or part of the process oil to the SBCCP when the SBCCP is made in solution, prior to recovery of the polymer by removal of the solvent. We also contemplate adding all or part of the process oil to the SBCCP after recovery of the polymer and as a part of the process of addition of other ingredients as outlined above. It is within the scope of our invention that the procedure of addition of the process oil is of interest only so far as the final mixture of the SBCCP and the process oil is a substantially homogeneous mixture where all of the process oil, irrespective of the procedure of addition, is evenly distributed within the SBCCP. A test of the even distribution or homogenity and/or miscibility of the process oil within the SBCCP is expected to be that the combination of the process oil and the SBCCP will display in a Differential Scanning Calorimeter (hereinafter DSC) test, under conditions shown below, a substantially single feature for the Glass Transition temperature. This experimental Glass Transition temperature of the combination of SBCCP and the process oil is reported as the $T_g$ of the combination described above.

In this embodiment, where the process oil is added prior to solvent recovery, it is important to note that the process oil should be of a high enough boiling point to have little of the process oil lost during the removal of the process solvent. By little we intend less than 7% by weight, preferably less than 5% by weight, more preferably less than 3% by weight of added process oil is removed with the solvent. Likewise, we intend that little of the process solvent remain with the SBCCP/process oil blend e.g. less than about 1% by weight, preferably less than about 0.5% by weight, more preferably less than about 0.3% by weight.

Selection of Process Oil to Lower $T_g$

Embodiments of our invention show that the $T_g$ of SBCCP can be substantially lowered using process oils as plasticizers. This is shown in the data shown in example 7, 8, 9 and 10 compared to the comparative non-inventive example 11. In these examples we exemplify both the invention of lowering the $T_g$ of the SBCCP with process oils as well as the invention of the process of the selection of the process oil depending on the content of the FRCO in the SBCCP.

While we do not yet fully understand this surprising effect and its implications, we believe that the introduction of greater amounts of the FRCO in the SBCCP leads to changes in the cohesive energy density of the SBCCP. These changes in the cohesive energy density are large and can be approximately measured by the changes in the refractive index of the SBCCP. The changes in the refractive index of the SBCCP are dependent on the concentration of the FRCO in the SBCCP. We show the changes in the refractive index of the SBCCP composed principally of ethylene and norbornene in FIG. 2 below. Additional complementary support for the changes in the cohesive energy density of the SBCCP of ethylene and norbornene are shown in the accompanying data on the increase in the cohesive energy density of the SBCCP on introduction of increasing amount of the norbornene FRCO also shown in FIG. 2 below. It is understood that FRCO are unique among the saturated monomers in SBCCP in having a significant effect on the refractive index. Thus the introduction of propylene, in the same composition ranges as the amount of the norbornene in FIG. 2, into a polyethylene chain has very small effect on the refractive index. We estimate that the changes in the refractive index of a ethylene-propylene polymer is less than about 10% of the change in the refractive index for a ethylene-norbornene polymer.

Figure 2:
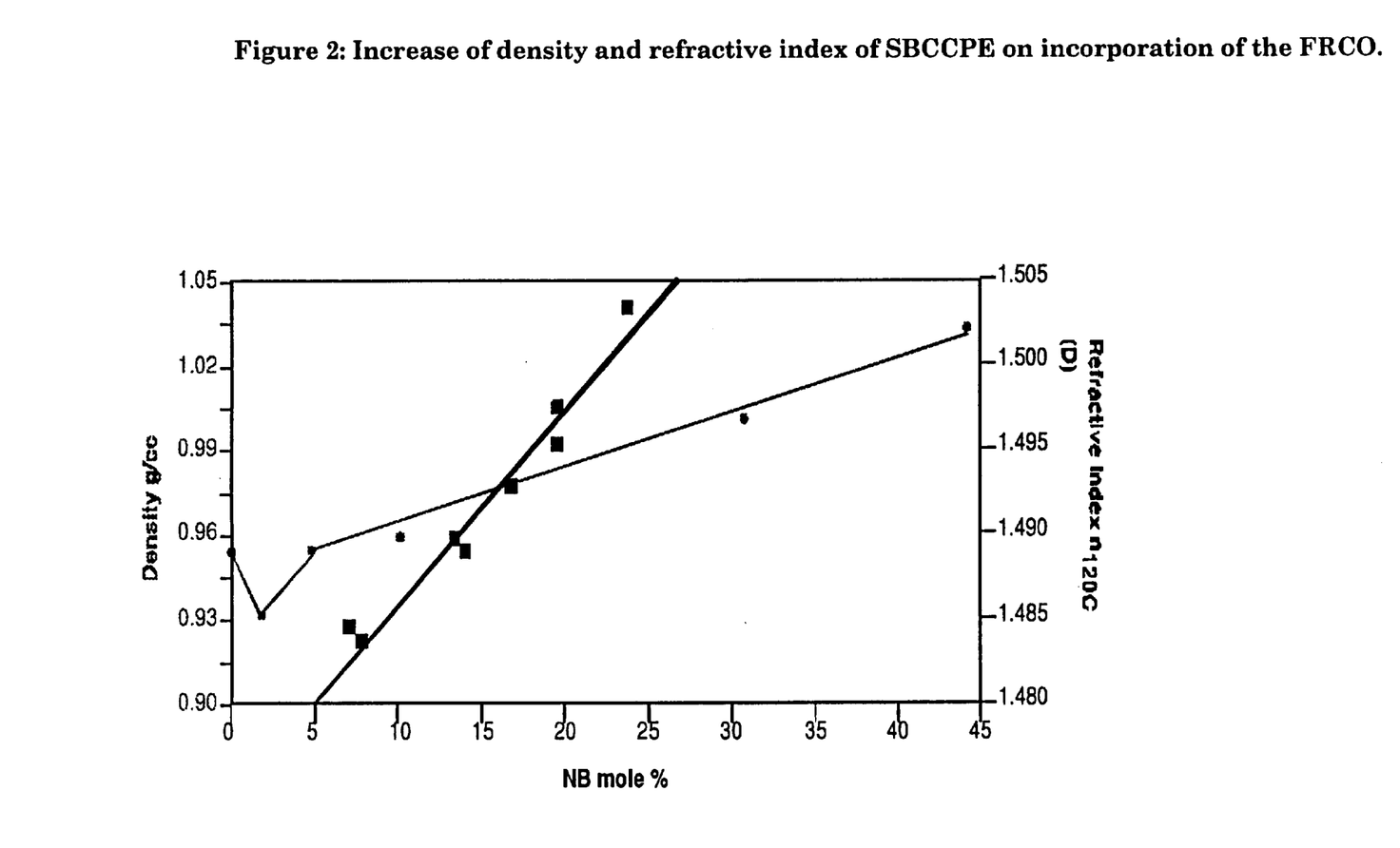
FIG. 2 shows the increase of density and refractive index of SBCCP with increasing incorporation of fuse ring cyclic olefin.
Figure 3:
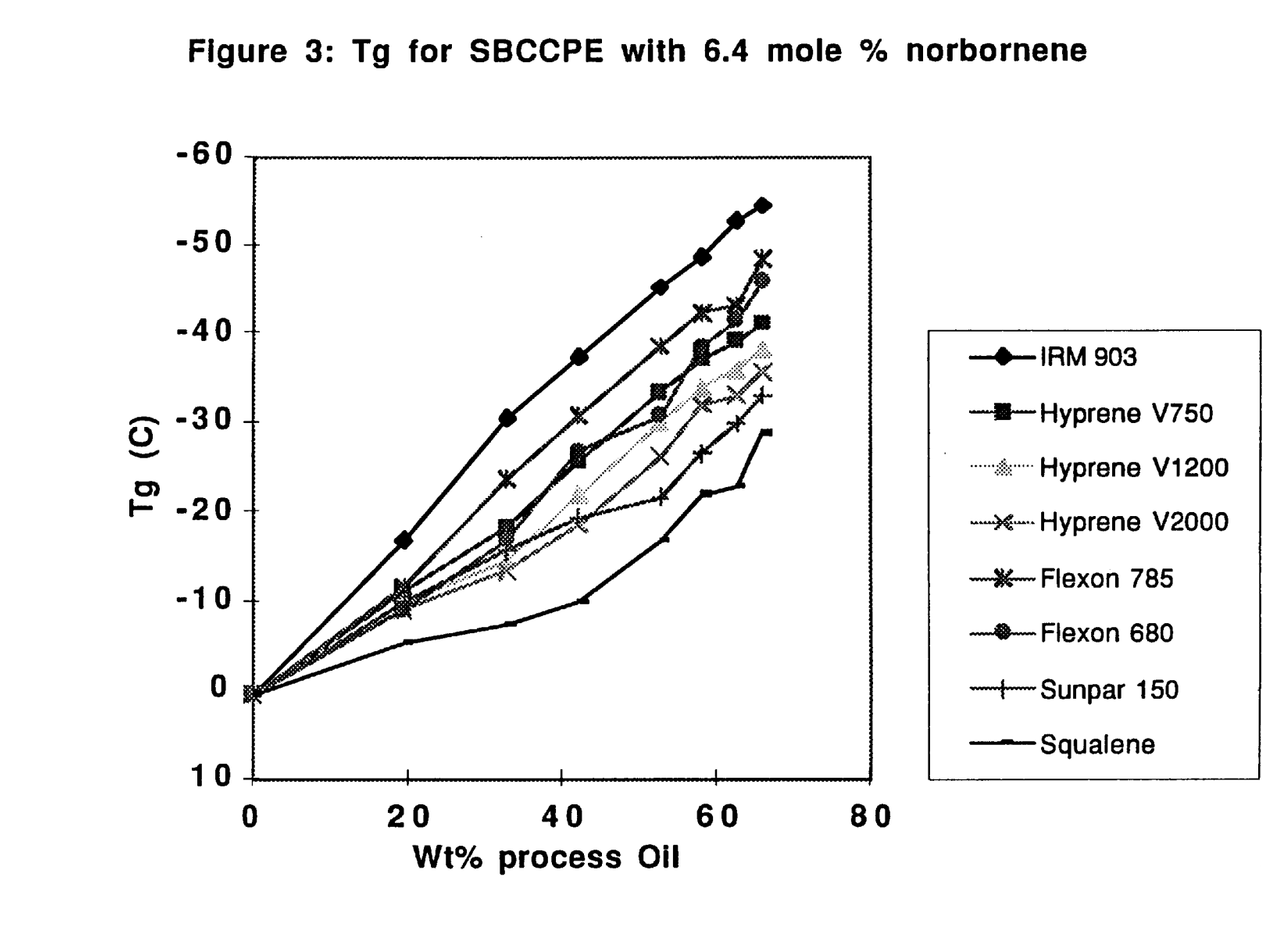
FIG. 3 shows $T_g$ of a SBCCP with 6.4 mole % norbornene with various process oils at various concentrations.
Figure 4:
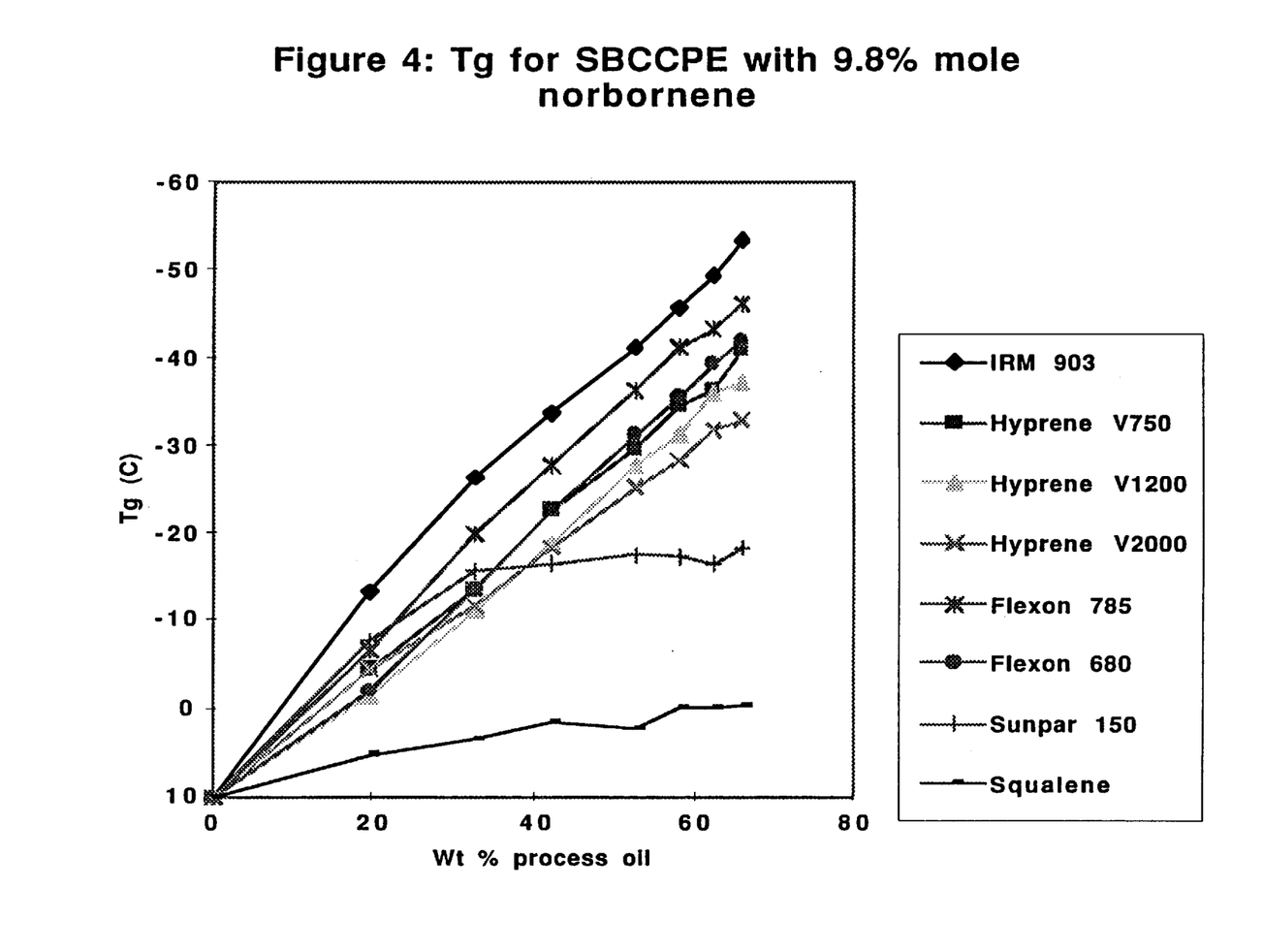
FIG. 4 shows $T_g$ of a SBCCP with 9.8 mole % norbornene with various process oils at various concentrations.
Figure 5:
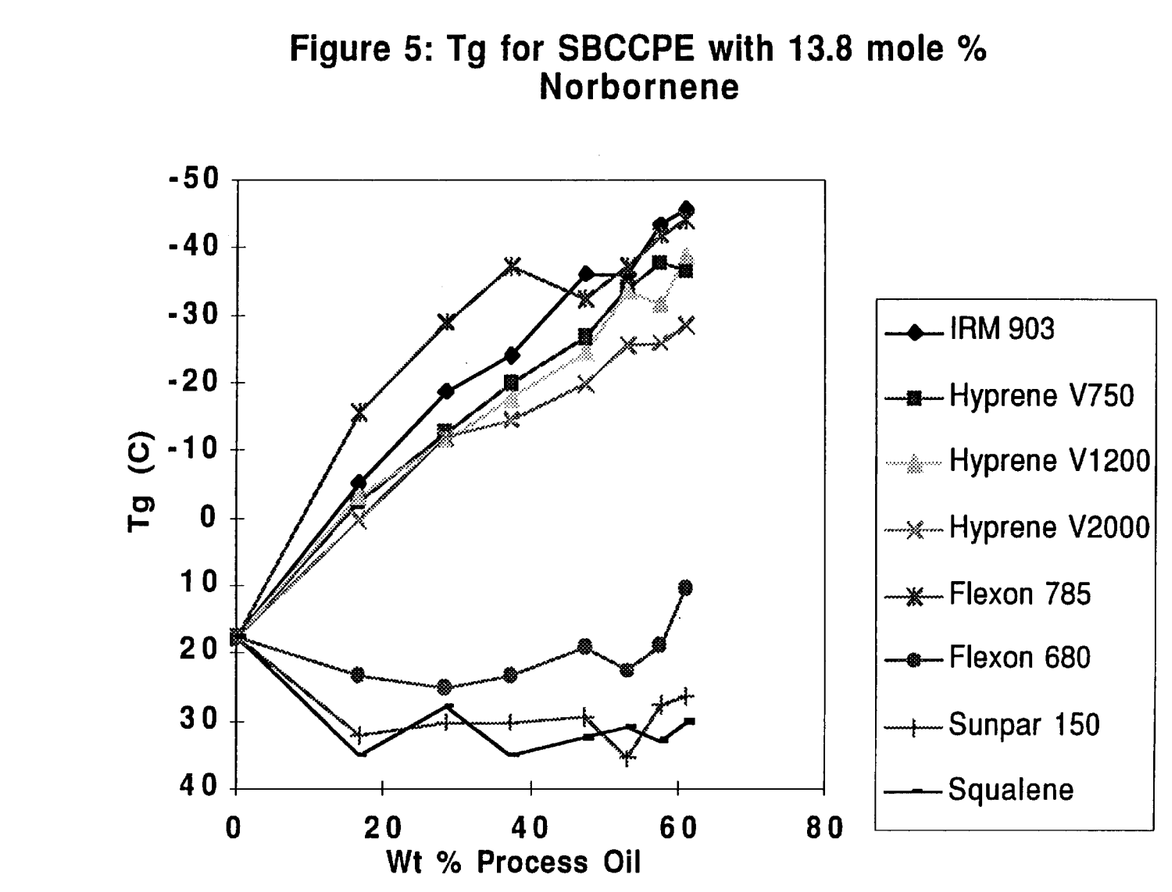
FIG. 5 shows $T_g$ of a SBCCP with 13.8 mole % norbornene with various process oils at various concentrations.
Figure 6:
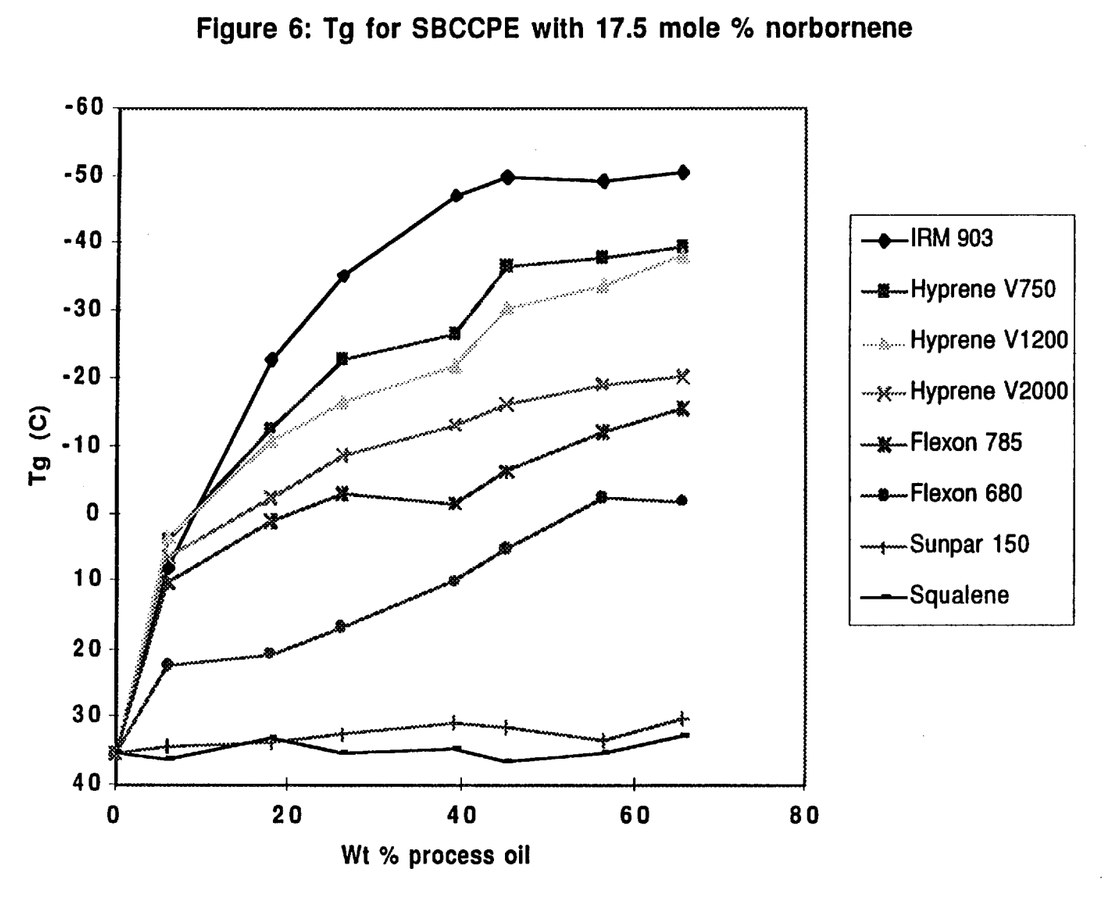
FIG. 6 shows $T_g$ of a SBCCP with 17.5 mole % norbornene with various process oils at various concentrations.
Figure 7:
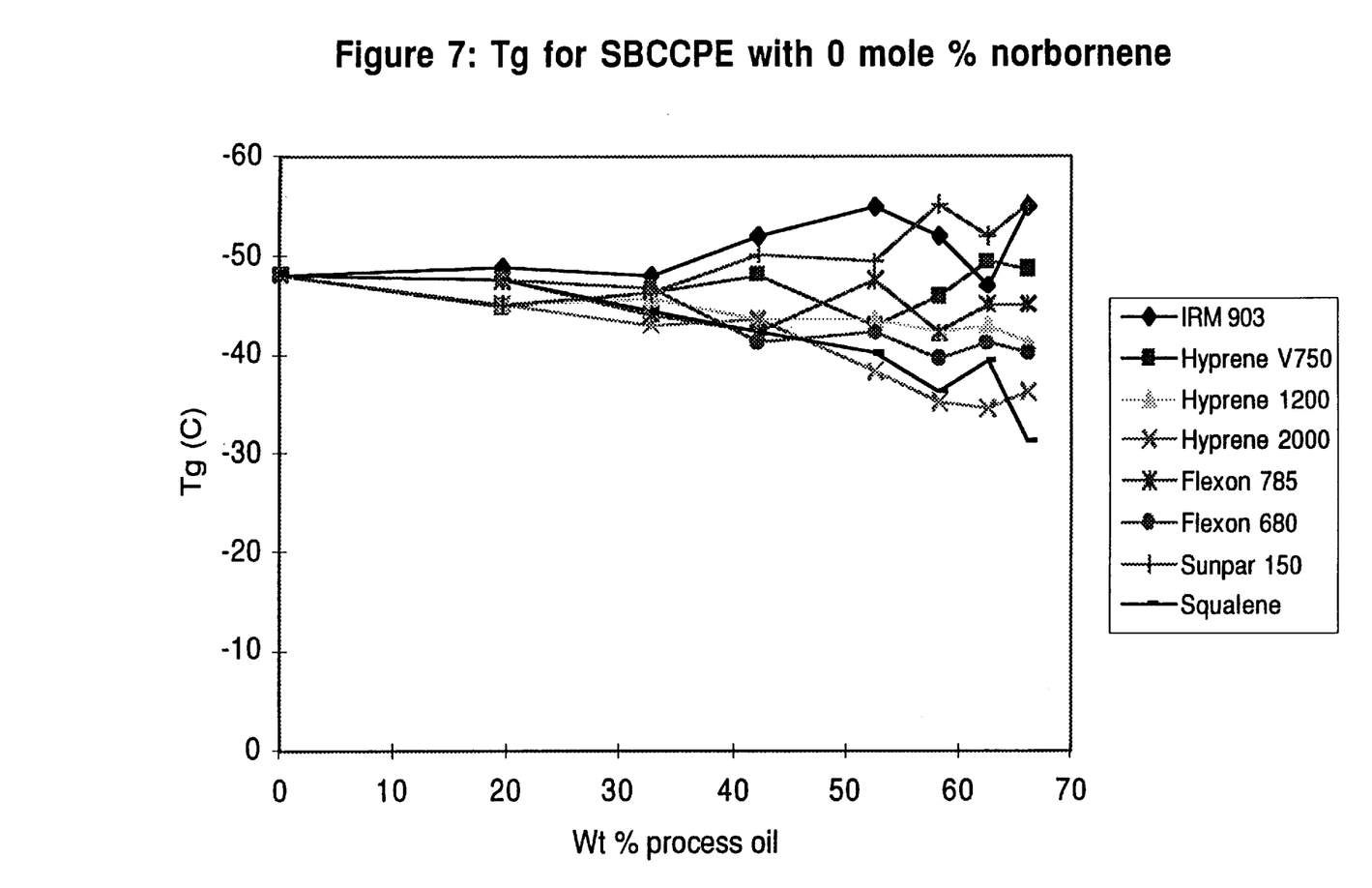
FIG. 7 shows $T_g$ of a SBCCP with 0 mole % norbornene with various process oils at various concentrations.

These increases in the refractive index of the SBCCP can be correlated to the increase in the cohesive energy density of the SBCCP. The cohesive energy density of the SBCCP is approximated by Equation 3 the relation where $n_{20}^D$ is the refractive index of the SBCCP at 20° C. for the D line of sodium discharge lamp.

$$\text{Cohesive energy density} = \{9.55 * n_{20}^D - 5.55\}^2 \quad \text{Eq. 3}$$

The selection of the process oil to effect this reduction of the $T_g$ of the SBCCP and to induce the appearance of elastomeric properties is the second part of the invention. In order to effect the greatest decrease in the $T_g$, the process oil and the SBCCP must have similar cohesive energy density. The representation in FIG. 2 and the correlation in Eq. 3 show that the cohesive energy density of a SBCCP containing greater amounts of FRCO is larger than a SBCCP containing smaller amounts of FRCO. Unexpectedly and surprisingly, in order to lower the $T_g$ of the SBCCP containing the greater amount of FRCO, it is necessary to use a process oil of a higher cohesive energy density. The representation of FIG. 1 shows that the introduction of norbornene FRCO into a SBCCP leads to monotomic increases in the $T_g$ of the polymer. Thus an implication of the invention is that the depression of the $T_g$ of SBCCP containing the larger amounts of FRCO, which has a predictably higher $T_g$, requires a process oil having a higher cohesive energy density.

The cohesive energy density of process oils are not determined directly but are correlated to the aniline point. The aniline point of process oils is the temperature in degrees Fahrenheit (° F.) where an equivolume mixture of the process oil and aniline are completely miscible. This is determined according to ASTM method D611. Process oils with a relatively high cohesive energy density have a low aniline point while the process oils with a low cohesive energy density have a high aniline point. A representative selection of process oils with different aniline points are shown in Table 2.

Use of the phrase or effective amount "sufficient process oil to lower the $T_g$ of the SBCCP" to a certain point is intended to mean that one of ordinary skill in the art, given the teachings herein could determine which oil or oils to add and in what amounts to lower the $T_g$ of the SBCCP to the stated level, as will be seen from the examples which follow.

TABLE 2

Aniline points for different process oils

| Process Oils | Aniline Point (° F.) |
|---|---|
| Flexon 340 | 89 |
| Sundex 790 | 97 |
| Flexon 111 | 108 |
| Flexon 190 | 110 |
| Flexon 391 | 134 |
| IRM 903 | 160 |
| Hyprene V60 | 161 |
| Hyprene V100 | 162 |
| Hyprene V150 | 162 |
| Hyprene V200 | 166 |
| Hyprene V300 | 168 |
| Flexon 641 | 170 |
| Hyprene V500 | 172 |
| Hyprene V750 | 178 |
| Hyprene V1200 | 183 |
| Hyprene V2000 | 187 |
| Flexon 580 | 187 |
| Flexon 660 | 196 |
| Flexon 650 | 198 |
| Flexon 680 | 207 |
| Flexon 845 | 214 |
| Flexon 766 | 221 |
| Flexon 785 | 229 |
| Flexon 885 | 237 |
| Flexon 815 | 261 |
| Sunpar 150 | 268 |
| Squalene | 283 |

Flexon is a registered trademark of Exxon Corporation
Hyprene is a registered trademark of Ergon

EXAMPLES

In the examples described below the techniques for determining the molecular weight distribution are found in U.S. Pat. No. 4,540,753 (Cozewith, Ju and Ver Strate) and references cited therein and in Macromolecules 1988, volume 21, p 3360 (Ver Strate et al) and references cited therein, both incorporated herein by reference for purposes of U.S. patent practice.

In these examples, the technique for determining the glass transition temperature is described below: About 6 to 10 mg of a sheet of the polymer pressed at approximately 150° C. to 200° C. is removed with a punch die. This is annealed at room temperature for 45 to 60 hours. At the end of this period the sample is placed in a Differential Scanning Calorimeter (Perkin Elmer 7 Series Thermal Analysis System) and cooled to −70° C. to −100° C. The sample is heated at 20° C./min. to attain a final temperature of 150° C. to 180° C. The thermal output is recorded and the inflection point in the thermal output data, indicating a change in the heat capacity is determined by electronically differentiating the thermal output data. The maximum in the differential thermal output data in the range of 40° C. to −70° C. corresponds to the $T_g$ of the sample by DSC and is reported without correction in these examples.

The data in the examples shows that the $T_g$ of the SBCCP is depressed by the incorporation of limited amounts of process oils. Further, the selection of the process oil is important in determining the extent of depression of the $T_g$ of the SBCCP. SBCCP with higher levels of norbornene need process oil with a lower aniline point in order to achieve a depression of the $T_g$ to below −30° C. We believe that this temperature is the maximum $T_g$ which can be tolerated for an elastomer.

Example 1

The polymerization catalyst used for this polymerization was a homogeneous metallocene catalyst. 2.0 mg Cp$_2$ZrMe$_2$ (bis cyclopentadienyl dimethyl zirconium) is weighed out in a 3 mL vial in a dry box and N,N-Dimethylanalinium tetra-perflurophenyl boron activator is added to give a slight molar excess of the zirconium compound. 2 mL of dry toluene is added to this mixture and the solution is allowed to stand for 30 min. with occasional stirring until activation is complete.

0.6 L of dry toluene is transferred using a cannula to a clean, dry and $N_2$ purged 2 L autoclave reactor using air exclusion techniques. The solvent is stirred under a continued slow $N_2$ purge (10 L/min.) while the reactor is equilibrated at 40° C. A scavenger, triisobutylaluminum is added after diluting 0.5 mL of a 1 M toluene solution with additional toluene (10 to 20 mL). 23.7 g norbornene is added to the reactor as a concentrated solution (86 wt. %) in toluene with a cannula. The $N_2$ purge is terminated and the reactor is sealed. The solution in the reactor is saturated with ethylene gas maintained at 35 psi. The reactor is then momentarily vented and the catalyst solution is added to the reactor with a cannula. The ethylene pressure is quickly returned to 35 psi by opening the ethylene flow controller which is set to provide a maximum of 10 L/min. replenishing flow. Polymerization proceeds rapidly and the mixture was stirred at 40° C. for 25 min.

The reaction was terminated by rapid venting of the gaseous reactor contents and the solution was poured into 1 L of acetone. The resulting white solid polymer was washed, separated by filtration, and dried in a vacuum oven overnight. 11.6 g of copolymer was obtained that had a melt temperature of 66° C. (by DSC), Mw=219,293, MWD=1.97 (by GPC), and 13.4 mole % norbornene (by $^1$HNMR).

Example 2

The polymerization catalyst used in this polymerization is a metallocene polymerization catalyst supported on silica. It has 0.4 wt. % Zr as $Me_2Si(n-BuCp)(MeCp)ZrCl_2$ on a silica support and is activated with MAO methylalumoxane? (Al:Zr ratio about 100:1). 30 mg of this dry catalyst is transferred to a high pressure catalyst injection tube in the dry box, sealed, removed and attached to the reactor via one of the purge ports.

0.6 L of dry hexane is transferred to a clean, dry and $N_2$ purged 2 L autoclave reactor using a cannula using air exclusion techniques. The solvent is stirred under a continued slow $N_2$ purge (10 L/min.) while the reactor is equilibrated at 80° C. 5.0 mL of a 10 wt. % methylalumoxane solution in toluene was added through a cannula as a scavenger. 15.0 g norbornene, as a concentrated solution in toluene (86 wt. %), is added to the reactor via cannula through the purge port of the reactor. The $N_2$ purge is terminated and the reactor is sealed. The solution in the reactor is saturated with ethylene gas maintained at 60 psi. The reactor is then momentarily vented and the catalyst solution is added to the reactor using a toluene line attached to the other end of the catalyst tube. High pressure $N_2$ (300 psi SI units) was used to pressure flush the catalyst into the reactor using 2–3×50 mL aliquots of toluene The ethylene pressure is quickly returned to 60 psi by opening the ethylene flow controller which is set to provide a maximum of 10 L/min. replenishing flow. Polymerization proceeds rapidly and the mixture is stirred at 80° C. for 30 min.

The reaction is terminated by rapid venting of the gaseous reactor contents and the mixture of solid and liquid contents were poured into 1 L acetone. The resulting white solid polymer is washed, separated by filtration, and dried in a vacuum oven overnight. 8.2 g of copolymer is obtained that had a broad melt temperature range centered about 80° C. (by DSC) and had Mw=99,659, and MWD=1.67 (by GPC).

Example 3

A 7.5 liter pressurized glass reactor, equipped with a thermocouple and a mechanical stirrer and cooled by a external jacketed recirculating ethylene glycol/water bath is purged for several hours with nitrogen. It is partly filled with 3 L of dry, deoxygenated cyclohexane and cooled to 10° C. The solution is agitated at approximately 150 rpm and a solution of 20 g of norbornene is added to the vessel along with 50 mL of a 25% solution of ethyl aluminum sesquichloride in hexane. Ethylene is purged into the vessel at 100 g per hour and approximately seven minutes after the addition of ethylene was started the flow of two solutions is initiated. The first solution is a dilute solution of (1 ml in 6400 ml of hexane) vanadium tetrachloride in hexane added at the rate of 15 mL/min. This corresponds to the addition of vanadium tetrachloride at the rate of 0.0026 gm/min. The second solution is solution of norbornene in hexane added at the rate of 15 mL/min. This corresponds to the addition of norbornene at the rate of 1.33 gm/min. A rapid polymerization ensued evident from slowly increasing viscosity of the solution. The temperature is maintained in the range of 10° C. to 12° C. with the refrigerated external bath. The flow of ethylene, vanadium chloride and the mixture of norbornene, tetraethoxy silane are monitored every two minutes during the polymerization and the flow is maintained for two hours.

At the end of the reaction period the polymerization reaction is terminated by stopping the flow of all reactants. Stirring is continued and the polymerization and quenched by addition of 25 mL of tetraethoxy silane followed 150 mL of hot water. After several minutes the hydrolysis of the reaction residues is complete and the slightly hazy solution of the polymer is deashed with slightly acid water, maintained at pH 1 to 2, rewashed with water and precipitated in an excess of isopropanol. The precipitated polymer is removed by filtration and treated with 300 ppm of Irganox®-1076 (available from Ciba Geigs) and dried at 80° C. to yield 376 g of an ethylene-norbornene polymer with $T_g$ of +8° C.

Example 4

A 7.5 liter pressurized glass reactor, equipped with a thermocouple and a mechanical stirrer and cooled by a external jacketed recirculating ethylene glycol/water bath is purged for several hours with nitrogen. It was partly filled with 3 L of dry, deoxygenated toluene and cooled to 15° C. The solution is agitated at approximately 150 rpm and a solution of 15 g of norbornene is added to the vessel along with 50 mL of a 25% solution of ethyl aluminum sesquichloride in hexane. Ethylene and propylene are purged into the vessel at the rate of 100 g per hour and 45 gm per hour, respectively. Approximately seven minutes after the addition of ethylene and propylene is started the flow of two solutions is initiated. The first solution is a dilute solution of vanadium tetrachloride (1 mL/6400 mL of hexane) in hexane added at the rate of 12.5 mL/min. The second solution is solution of (160 g of norbornene in 1600 mL of hexane) norbornene in hexane added at the rate of 12.5 ml/min. A rapid polymerization ensued evident from slowly increasing viscosity of the solution. The temperature is maintained in the range of 12° C. to 17° C. with the refrigerated external bath. The flow of ethylene, propylene, vanadium chloride solution and norbornene solution are monitored every two minutes during the polymerization. Adjustments are made to the flow of the reactants and the refrigeration bath to maintain the reaction conditions for 2 hours.

At the end of the reaction period the polymerization reaction is terminated by stopping the flow of all reactants. Stirring is continued and the polymerization and quenched by addition of 20 mL of tetraethoxy silane followed 100 mL of hot water. After several minutes the hydrolysis of the reaction residues is complete and the clear solution of the polymer is deashed with slightly acid water, maintained at pH 1 to 2, rewashed with water and precipitated in an excess of isopropanol. The precipitated polymer is removed by filtration and treated with 300 ppm of Irganox®-1076 and dried at 80° C. to yield 412 g of an copolymer of ethylene, propylene and norbornene polymer with $T_g$ of –8.5° C.

Example 5

A 7.5 liter pressurized glass reactor, equipped with a thermocouple and a mechanical stirrer and cooled by a external jacketed recirculating ethylene glycol/water bath is purged for several hours with nitrogen. It was partly filled with 3 L of dry, deoxygenated toluene and cooled to 15° C. The solution is agitated at approximately 150 rpm and a solution of a mixture of 15 g of norbornene and 1 mL of tetra ethoxy silane is added to the vessel along with 45 mL of a 25% solution of ethyl aluminum sesquichloride in hexane. Ethylene is purged into the vessel at the rate of 100 g per hour. Approximately seven minutes after the addition of ethylene is started the flow of two solutions was initiated. The first solution is a dilute solution of vanadium tetrachloride (1 mL/6400 mL of hexane) in hexane added at the rate of 12.5 mL/min. The second solution was a mixture of 220 g of norbornene, 40 mL of 5-ethylidene-2-norbornene and 1 mL of tetraethoxy silane in 1600 mL of hexane. This hexane solution is added at the rate of 12.5 mL/min. A rapid polymerization ensued evident from slowly increasing viscosity of the solution. The temperature is maintained in the range of 15° C. to 20° C. with the refrigerated external bath. The flow of ethylene, propylene, vanadium chloride solution and mixed norbornene, 5-ethylidene-2-norbornene and 1 mL of tetraethoxy silane solution are monitored every two minutes during the polymerization. Adjustments are made to the flow of the reactants and the refrigeration bath to maintain the reaction conditions for 2 hours.

At the end of the reaction period the polymerization reaction is terminated by stopping the flow of all reactants. Stirring is continued and the polymerization and quenched by addition of 20 mL of tetraethoxy silane followed 100 mL of hot water. After several minutes the hydrolysis of the reaction residues is complete and the clear solution of the polymer is deashed with slightly acid water, maintained at pH 1 to 2, rewashed with water and precipitated in an excess of isopropanol. The precipitated polymer is removed by filtration and treated with 300 ppm of Irganox-1076 and dried at 80° C. to yield 468 g of an copolymer of ethylene, 5-ethylidene-2-norbornene and norbornene with $T_g$ of 18.3° C. by DSC.

Example 6

A 7.5 liter pressurized glass reactor, equipped with a thermocouple and a mechanical stirrer and cooled by a external jacketed recirculating ethylene glycol/water bath is purged for several hours with nitrogen. It is partly filled with 2 L of dry, deoxygenated toluene, 1 L of dry, deoxygenated hexane and cooled to 10° C. The solution is agitated at approximately 150 rpm and a solution of 16.8 g of norbornene is added to the vessel along with 50 mL of a 25% solution of ethyl aluminum sesquichloride in hexane. Ethylene is purged into the vessel at 100 g per hour and approximately seven minutes after the addition of ethylene is started the flow of two solutions is initiated. The first solution is a dilute solution of vanadium tetrachloride in hexane added at the rate of 12.5 mL/min. This corresponds to the addition of vanadium tetrachloride at the rate of 00026 gm/min. The second solution is solution of norbornene in hexane added at the rate of 12.5 mL/min. This corresponds to the addition of norbornene at the rate of 1.5 gm/min. A rapid polymerization ensued evident from slowly increasing viscosity of the solution. The temperature is maintained in the range of 10° C. to 12° C. with the refrigerated external bath. The flow of ethylene, vanadium chloride and norbornene are monitored every two minutes during the polymerization and the flow was maintained for two hours.

At the end of the reaction period the polymerization reaction is terminated by stopping the flow of all reactants. Stirring is continued and the polymerization and quenched by addition of 25 mL of tetraethoxy silane followed 150 mL of hot water. After several minutes the hydrolysis of the reaction residues is complete and the slightly hazy solution of the polymer is deashed with slightly acid water, maintained at pH 1 to 2 and rewashed with water. To this solution is added 250 gm of Hyprene 1200, a napthenic process oil of class 1. The polymer with process oil used as a diluent and as an agent to lower the $T_g$ is recovered by removal of the solvent by steam distillation. The precipitated polymer treated with 300 ppm of Irganox-1076 and dried at 80° C. to yield 612 g of an ethylene-norbornene polymer diluted with Hyprene 1200 with a $T_g$ of –42° C.

Example 7

A solution of an ethylene norbornene copolymer containing 6.4 mole % nobornene and the balance ethylene, the copolymer having a $T_g$ of –0.6° C. by DSC, is dissolved in cyclohexane to form a solution containing approximately 5 wt. % polymer. The polymer solution is inhibited from degradation in air during future manipulation of the polymer by the addition of 200 ppm of Irganox®-1076.

Aliquots of this solution are added to known weights of various process oils as shown in the Table 4 below. The samples are stirred to disperse the components of the mixture and evaporated with slight agitation in a oven maintained both above the boiling point of cyclohexane (80° C.) and the highest melting point component of the polymer. The dried polymer samples containing the oil were removed quantitatively and were pressed in between the platens of a hydraulic press maintained at 150° C. to remove that last traces of the solvent and was homogenized by repeatedly folding and pressing the sample. After two or three folding operations the sample is visually clear and the sample was considered homogeneous after 7 or 8 pressing and folding operations. A portion of the sample was analyzed by DSC and the $T_g$ is determined as described earlier. The data for the DSC is also shown in Table 4 below. In Table 4 the various process oils are enumerated in the horizontal row and the weight percent of the process oil in each process oil. SBCCP and process oil blends are described as weight percent of the blend that is the process oil. For each composition the measured $T_g$ by DSC is shown in ° C.

TABLE 4

Depression of $T_g$ of an SBCCP containing 6.4 mole % norbornene

| Composition | Glass transition temperature (° C.) for process oil | | | | | | | |
|---|---|---|---|---|---|---|---|---|
| Wt % Process oil | IRM 903 | Hyprene V750 | Hyprene V1200 | Hyprene V2000 | Flexon 785 | Flexon 680 | Sunpar 150 | Squalene |
| 0 | 0.6 | 0.6 | 0.6 | 0.6 | 0.6 | 0.6 | 0.6 | 0.6 |
| 19.6 | −16.9 | −10.9 | −9.8 | −9 | −11.7 | −8.9 | −9.8 | −5.2 |
| 32.7 | −30.5 | −18.3 | −14.5 | −13.2 | −23.6 | −16.7 | −15.7 | −7.3 |
| 42.2 | −37.6 | −25.8 | −22 | −18.4 | −30.8 | −26.9 | −19.5 | −9.9 |
| 52.7 | −45.3 | −33.4 | −29.9 | −26.2 | −38.6 | −31 | −21.8 | −16.8 |
| 58.2 | −48.9 | −37.3 | −34 | −32.1 | −42.3 | −38.7 | −26.7 | −21.9 |
| 62.5 | −52.7 | −39.4 | −36.1 | −33.2 | −43.4 | −41.6 | −29.9 | −22.8 |
| 66.1 | −54.5 | −41.2 | −38.5 | −35.7 | −48.4 | −45.9 | −33.3 | −28.9 |

Example 8

The same procedure was followed as described in Example 7, but the solution contains an ethylene, norbornene copolymer having 9.8 mole % norbornene, the remaining ethylene, where the copolymer has a $T_g$ of 8° C. The results are shown in Table 5.

TABLE 5

Depression of $T_g$ of an SBCCP containing 9.8 mole % norbornene

| Composition | Glass transition temperature (° C.) for process oil | | | | | | | |
|---|---|---|---|---|---|---|---|---|
| Wt % Process oil | IRM 903 | Hyprene V750 | Hyprene V1200 | Hyprene V2000 | Flexon 785 | Flexon 680 | Sunpar 150 | Squalene |
| 0 | 10 | 10 | 10 | 10 | 10 | 10 | 10 | 10 |
| 19.6 | −13.4 | −4.5 | −1.4 | −4.6 | −6.7 | −2 | −7.6 | 5.2 |
| 32.7 | −26.5 | −13.5 | −11.3 | −11.8 | −20 | −13.7 | −15.7 | 3.2 |
| 42.2 | −33.6 | −22.7 | −19 | −18.3 | −27.8 | −22.7 | −16.5 | 1.4 |
| 52.7 | −41.3 | −29.6 | −27.9 | −25.5 | −36.5 | −31.3 | −17.7 | 2.3 |
| 58.2 | −45.9 | −34.6 | −31.2 | −28.3 | −41.1 | −35.6 | −17.4 | −0.3 |
| 62.5 | −49.5 | −36.5 | −36.1 | −31.9 | −43.4 | −39.3 | −16.5 | −0.2 |
| 66.1 | −53.5 | −40.9 | −37.3 | −33 | −46.4 | −41.9 | −18.5 | −0.4 |

Example 9

The same procedure was followed as described in Example 7, but the solution contains an ethylene, norbornene copolymer having 13.2 mole % norbornene, the remaining ethylene, where the copolymer has a $T_g$ of 17.7° C. The results are shown in Table 6.

TABLE 6

Depression of $T_g$ of an SBCCP containing 13.2 mole % norbornene

| Composition | Glass transition temperature (° C.) for process oil | | | | | | | |
|---|---|---|---|---|---|---|---|---|
| Wt % Process oil | IRM 903 | Hyprene V750 | Hyprene V1200 | Hyprene V2000 | Flexon 785 | Flexon 680 | Sunpar 150 | Squalene |
| 0 | 17.5 | 17.5 | 17.5 | 17.5 | 17.5 | 17.5 | 17.5 | 17.5 |
| 16.4 | −5.2 | −2.5 | −3.4 | 0.1 | −16 | 23.4 | 32 | 35.2 |
| 28.2 | −18.9 | −12.9 | −11.8 | −11.9 | −29.1 | 25.3 | 30.1 | 27.8 |
| 37.1 | −24.3 | −20 | −17.7 | −14.7 | −37.5 | 23.4 | 30.2 | 35.2 |
| 47.3 | −36.2 | −26.8 | −24.7 | −19.9 | −32.5 | 19.3 | 29.5 | 32.4 |
| 52.9 | −36.3 | −34.1 | −33.6 | −25.8 | −37.4 | 22.7 | 35.3 | 30.7 |
| 57.4 | −43.4 | −37.9 | −31.8 | −26.1 | −42.2 | 18.9 | 27.3 | 32.6 |
| 61.1 | −45.9 | −36.7 | −39.1 | −28.6 | −44.3 | 10.5 | 26.5 | 30.1 |

Example 10

The same procedure was followed as described in Example 7, but the solution contains an ethylene, norbornene copolymer having 17.5 mole % norbornene, the remaining ethylene, where the copolymer has a $T_g$ of 35.2° C. The results are shown in Table 7.

TABLE 7

Depression of $T_g$ of an SBCCP containing 17.5 mole % norbornene

| Composition | Glass transition temperature (° C.) for process oil | | | | | | | |
|---|---|---|---|---|---|---|---|---|
| Wt % Process Oil | IRM 903 | Hyprene V750 | Hyprene V1200 | Hyprene V2000 | Flexon 785 | Flexon 680 | Sunpar 150 | Squalene |
| 0 | 35.2 | 35.2 | 35.2 | 35.2 | 35.2 | 35.2 | 35.2 | 35.2 |
| 6 | 7.8 | 3.8 | 3.4 | 6.3 | 10.2 | 22.5 | 34.2 | 36.2 |
| 17.9 | −22.9 | −12.8 | −10.9 | −2.5 | 0.9 | 20.7 | 33.8 | 33.1 |
| 26.2 | −35.3 | −22.7 | −16.5 | −8.9 | −3.2 | 16.9 | 32.6 | 35.1 |
| 39.3 | −47.3 | −26.8 | −22 | −13.4 | −1.8 | 9.9 | 30.7 | 34.7 |
| 45.3 | −49.9 | −36.9 | −30.4 | −16.2 | −6.4 | 5.3 | 31.5 | 36.3 |
| 56.4 | −49.4 | −38.1 | −33.8 | −19.2 | −12 | −2.7 | 33.5 | 35.2 |
| 65.7 | −50.6 | −39.5 | −38.2 | −20.4 | −15.8 | −2 | 30.2 | 32.9 |

Example 11: Comparative example

A solution of an ethylene propylene copolymer containing approximately 54 mole % ethylene (Vistalon 457, available from the Exxon Chemical Company, Houston, Tex.) and the balance having a $T_g$ of −48.1° C. by DSC was dissolved in cyclohexane to form a solution containing approximately 5 wt. % polymer. The polymer solution was inhibited from degradation in air during future manipulation of the polymer by the addition of 200 ppm of Irganox -1076.

Aliquots of this solution were added to known weights of various process oils as shown in the Table 8 below. The samples were stirred to disperse the components of the mixture and evaporated with slight agitation in a oven maintained both above the boiling point of cyclohexane (80° C.) and the highest melting point component of the polymer. The dried polymer samples containing the oil was removed quantitatively and were pressed in between the platens of a hydraulic press maintained at 150° C. to remove that last traces of the solvent and was homogenized by repeatedly folding and pressing the sample. After two or three folding operations the sample was visually clear and the sample was considered homogeneous after 7 or 8 pressing and folding operations. A portion of the sample was analyzed by DSC and the $T_g$ was determined as described earlier. The data for the DSC is also shown in Table 8 below. In Table 8 the various process oils are enumerated in the horizontal row and the weight percent of the process oil in each process oil SBCCP blend are represented as weight percent of the blend that is the process oil. For each composition the $T_g$ is shown in ° C.

Table 9 blended with 4 phr of SP-1045, a phenolic resin curative available from Schnectady Chemicals, New York, USA and 1 phr of SnCl2. The blending was conducted in a 45 ml Brabender internal mixer at a temperature not to exceed 120° C. for about 4 minutes. At the end of the mixing the blend was vulcanized at 185° C. for 15 minutes in an electrically heated press into a sheet. The sample of the specimen, in the shape of a tensile bar, was removed and mounted on a Instron extensometer. The sample was elongated to 200% of its original dimension along the long axis of the tensile bar at the rate of 51 cm/min and allowed to retract to the original dimension at the same rate. The permanent distension in the long axis of the tensile specimen was measured and is reported below as the tension set.

TABLE 9

Tension set of SBCCP/process oil blends

| SBCCP | Process oil (type, wt %) | Tension Set (%) |
|---|---|---|
| Example 9 | none | 97 |
| Example 9 | Squalene | 112 |
| Example 9 | IRM903 | 19 |
| Example 10 | none | sample broke |
| Example 10 | Squalene | sample broke |
| Example 10 | IRM903 | 12 |

Although the present invention has been described in considerable detail with reference to certain preferred versions thereof, other versions are possible. For example while

TABLE 8

Depression of $T_g$ of an ethylene polymer containing 0 mole % norbornene

| Composition | Glass transition temperature (° C.) for process oil | | | | | | | |
|---|---|---|---|---|---|---|---|---|
| Wt % Process oil | IRM 903 | Hyprene V750 | Hyprene V1200 | Hyprene V2000 | Flexon 785 | Flexon 680 | Sunpar 150 | Squalene |
| 0 | −48.1 | −48.1 | −48.1 | −48.1 | −48.1 | −48.1 | −48.1 | −48.1 |
| 19.6 | −49 | −45 | −45.2 | −45.2 | −47.5 | −47.5 | −45.2 | −47.5 |
| 32.7 | −48 | −46.2 | −45.6 | −43.2 | −44.2 | −46.8 | −46.3 | −44.5 |
| 42.2 | −52 | −48.2 | −43.6 | −43.6 | −42.3 | −41.2 | −50.2 | −42.3 |
| 52.7 | −55 | −43.2 | −43.6 | −38.2 | −47.6 | −42.3 | −49.5 | −40.2 |
| 58.2 | −52 | −46 | −42.3 | −35.2 | −42.3 | −39.6 | −55.2 | −36.2 |
| 62.5 | −47 | −49.4 | −43.2 | −34.5 | −45.3 | −41.3 | −52 | −39.5 |
| 66.1 | −55 | −48.6 | −41.2 | −36.2 | −45.2 | −40.2 | −55.2 | −31.2 |

Example 12

Representative samples of the SBCCP/process oil combinations from the Examples 7, 8, 9, and 10 as shown in the norbornene has been exemplified other FRCO are contemplated. Therefore, the spirit and scope of the appended claims should not be limited to the description of the preferred versions contained herein.

We claim:

1. An ethylene cyclic olefin copolymer/process oil combination with a $T_g$ less than $-40°$ C. comprising:
    a) an ethylene, cyclic olefin copolymer where the ethylene is present in said copolymer in the range of about 40–95 mole %, said cyclic olefin is present in said copolymer in the range of about 5–60 mole % based on the total moles of said copolymer; said cyclic olefin has one olefinic unsaturated bond;
    where said copolymer has a $T_g$ greater than about 0° C., and a $M_n$ greater than 40,000 amu; and
    b) a process oil present in said combination at 10–100 parts per hundred parts of said copolymer to lower the $T_g$ of the combination to at least about $-40°$ C., said process oil having a boiling point greater than 175° C.; said copolymer/process oil combination after aging 2 hrs. @ 180° C. maintains said $T_g$.

2. The ethylene cyclic olefin copolymer/process oil combination of claim 1, wherein said ethylene is present in said copolymer in the range of from about 93–60 mole %, said cyclic olefin is present in said copolymer in the range of from about 7–40 mole %, and wherein said process oil is present in said combination at 30–70 parts per hundred parts of said copolymer.

3. The ethylene cyclic olefin copolymer/process oil combination of claim 1, wherein said cyclic olefin is one of norbornene, dicyclopentadiene, or combinations thereof.

4. The ethylene cyclic olefin copolymer/process oil combination of claim 1, wherein said cyclic olefin is bicyclo (2.2.1) hept-2-ene.

5. The ethylene cyclic olefin copolymer/process oil combination of claim 1, 2, 3, or 4, wherein said process oil is present in said combination from 40–65 parts by weight per hundred parts of said ethylene cyclic olefin copolymer.

6. A saturated backbone cyclic comonomer polyolefin (SBCCP)/process oil combination having a $T_g$ less than $-20°$ C. comprising:
    a) an ethylene, cyclic olefin copolymer of $M_n$>20,000 amu wherein said ethylene is present in said copolymer in the range of from about 40–95 mole %, said cyclic olefin is present in said copolymer in the range of from about 5–60 mole % based on the total moles of said copolymer, wherein said ethylene cyclic olefin copolymer has a backbone substantially free of unsaturation, wherein said ethylene cyclic olefin copolymer contains less than about 0.25 mole % of hetero atom containing moieties, said copolymer having a $T_g$ above 0° C.; and
    b) a process oil having a sufficient aniline point and present in an effective amount, to provide the combination of the ethylene cyclic olefin copolymer and process oil with a $T_g$ less than $-20°$ C.

7. The SBCC/process oil combination of claim 6, wherein said ethylene cyclic olefin copolymer further contains up to about 5 mole % of a non-conjugated diene, and up to about 30 mole % of an alpha-olefin, wherein said combination has a $T_g$ less than $-40°$ C., wherein said cyclic olefin has one olefinic unsaturated bond; and wherein said process oil is present in said combination from 10–400 parts per hundred parts of said copolymer.

8. The SBCCP/process oil combination of claim 6 wherein said ethylene cyclic olefin polymer further contains up to about 20 mole % of an alpha-olefin, said alpha-olefin being one of propylene butene-1, pentene-1,4-methyl-1-pentene, hexene-1, octene-1 or combinations thereof; up to about 3 mole % of a non-conjugated diene selected from one of ethylidene norbornene, dicyclopentadiene, vinyl norbornene or combinations thereof; said cyclic olefin has one olefinic unsaturated bond and where said ethylene cyclic olefin copolymer has a $M_n$ greater than 30,000; wherein said combination has a $T_g$ less than $-40°$ C.; and wherein said process oil is present in said combination from 10–100 parts per hundred parts of said copolymer.

9. A combination of a SBCCP and a process oil having a $T_g$ less than $-30°$ C. comprising:
    a) a polymer including ethylene, a cyclic olefin, optionally a non-conjugated diene and, optionally an α-olefin,
    wherein said cyclic olefin is one of norbornene, dicyclo pentadiene or
    combinations thereof;
    wherein said ethylene is present from about 93–80 mole %, said cyclic olefin is present from about 7–20 mole %;
    said (α-olefin is present from about 0–20 mole %, said non-conjugated diene is present from 0–3 mole %; the total moles of said monomers in 8 and SBCCP add up to 100 mole %, said polymer having a $T_g$ above 0° C.; and
    b) a process oil present in said combination at an effective amount to lower the $T_g$ of the polymer of a) to less than $-30°$ C., after the combination is aged 60 days @ 23° C.

10. The combination of claim 9 wherein said polymer has a $T_g$ above 10° C. and where said combination has a $T_g$ less than about $-40°$ C.

11. The combination any of claims 9, or 10, wherein said process oil is present in said combination from 10–100 parts per hundred parts of said polymer.

12. The combination any of claims 9, or 10, wherein said process oil is present in said combination from 40–65 parts per hundred parts of said polymer.

* * * * *